US012594977B2

(12) United States Patent
Lee

(10) Patent No.: US 12,594,977 B2
(45) Date of Patent: Apr. 7, 2026

(54) CROSS RAIL STRUCTURE FOR OHT SYSTEM AND OHT SYSTEM USING THE SAME

(71) Applicant: SEMES CO., LTD., Cheonan-si (KR)

(72) Inventor: Sung Ho Lee, Asan-si (KR)

(73) Assignee: SEMES CO., LTD., Cheonan-si (KR)

( * ) Notice: Subject to any disclaimer, the term of this patent is extended or adjusted under 35 U.S.C. 154(b) by 619 days.

(21) Appl. No.: 18/085,167

(22) Filed: Dec. 20, 2022

(65) Prior Publication Data

US 2023/0192158 A1 Jun. 22, 2023

(30) Foreign Application Priority Data

Dec. 21, 2021 (KR) ........................ 10-2021-0183772

(51) Int. Cl.
*B61J 1/06* (2006.01)
*B66C 17/12* (2006.01)

(52) U.S. Cl.
CPC ................. *B61J 1/06* (2013.01); *B66C 17/12* (2013.01)

(58) Field of Classification Search
CPC ........ B65G 47/22; B65G 47/52; B65G 47/80; B65G 21/22
See application file for complete search history.

(56) References Cited

U.S. PATENT DOCUMENTS

2009/0067962 A1* 3/2009 Lee ........................ B62D 65/18 414/331.11
2021/0162850 A1 6/2021 Ogo et al.

FOREIGN PATENT DOCUMENTS

| | | | |
|---|---|---|---|
| CN | 205855215 | 1/2017 | |
| CN | 108773655 | 11/2018 | |
| JP | 1993-82738 | 11/1993 | |
| JP | 2015-73559 | 4/2015 | |
| KR | 20090110504 A * | 10/2009 | ............. B65G 21/22 |
| KR | 10-2021-0022731 | 3/2021 | |

OTHER PUBLICATIONS

Office Action from the China National Intellectual Property Administration dated Sep. 13, 2025.

* cited by examiner

*Primary Examiner* — Scott A Browne

(57) ABSTRACT

The present invention relates to a cross rail structure for an OHT system and an OHT system using the same. According to the present invention, there is provided a cross rail structure for an OHT system, that is a point at which two orthogonal rails among rails that are installed in an OHT system and transport vehicles intersect with each other. The cross rail structure includes a pair of auxiliary rails that are installed at substantially the same height as the rail at the point at which the rails intersect with each other, and disposed parallel to each other at a predetermined distance; a movement unit that moves the auxiliary rails up and down; a rotation unit that rotates the auxiliary rail so that the auxiliary rails are disposed in any one of two directions orthogonal to each other; and a distance holding unit that holds a distance between the pair of auxiliary rails without an interference with the vehicle.

18 Claims, 5 Drawing Sheets

【FIG 1】
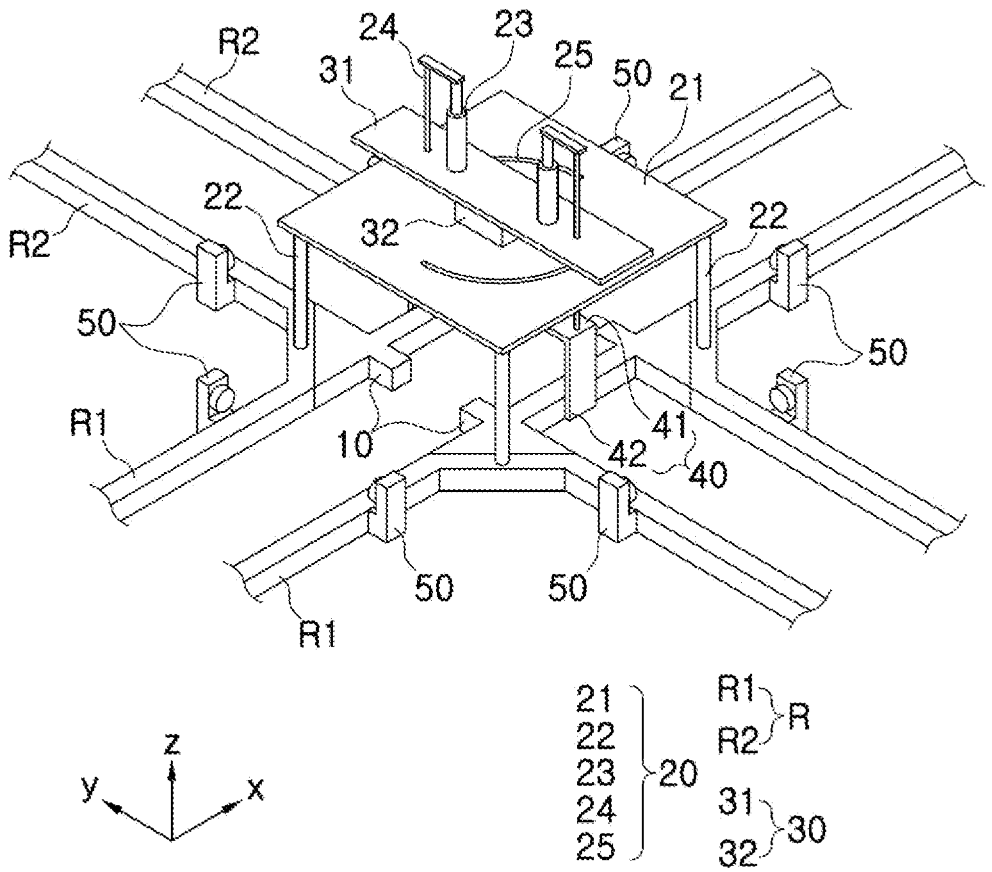

【FIG 2】
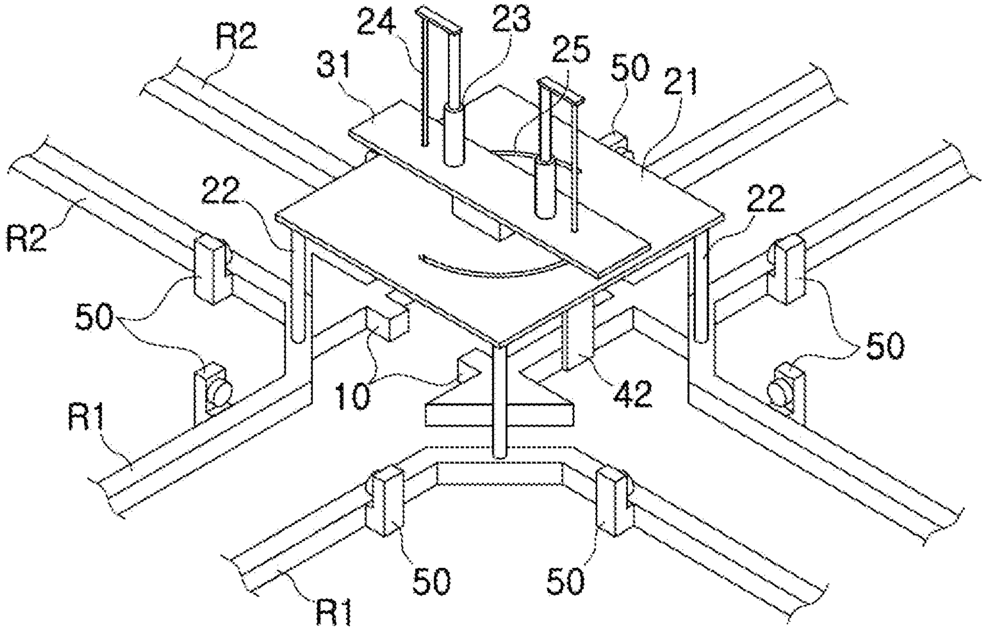

【FIG 3】
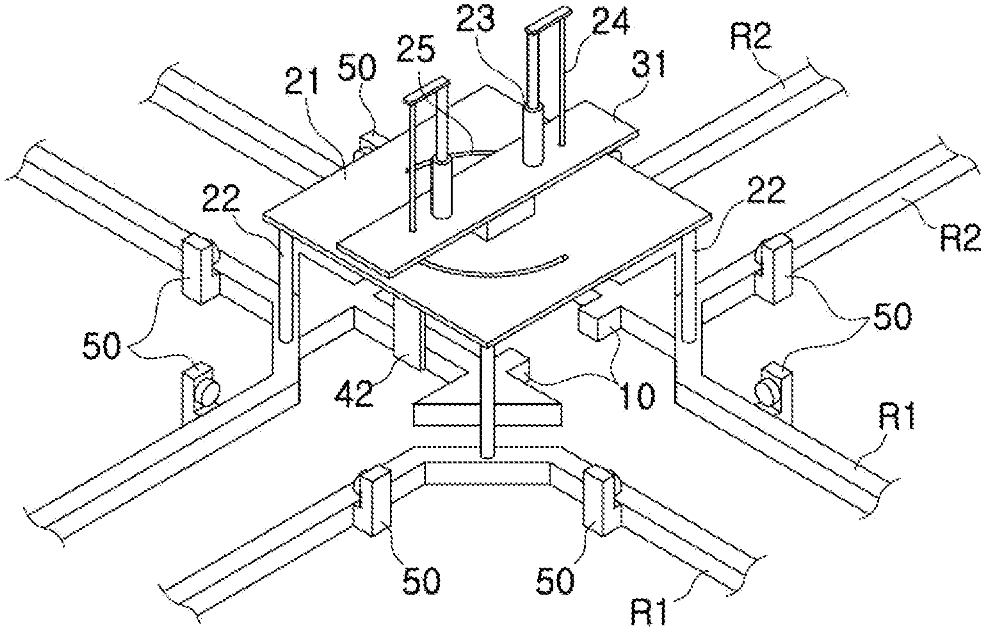

【FIG 4】
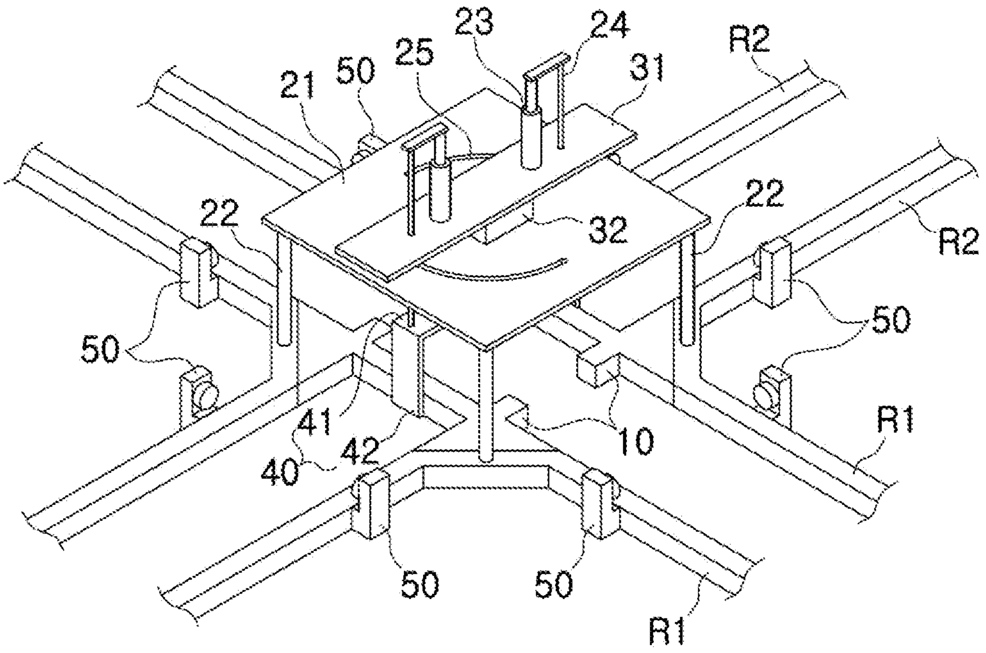

【FIG 5】
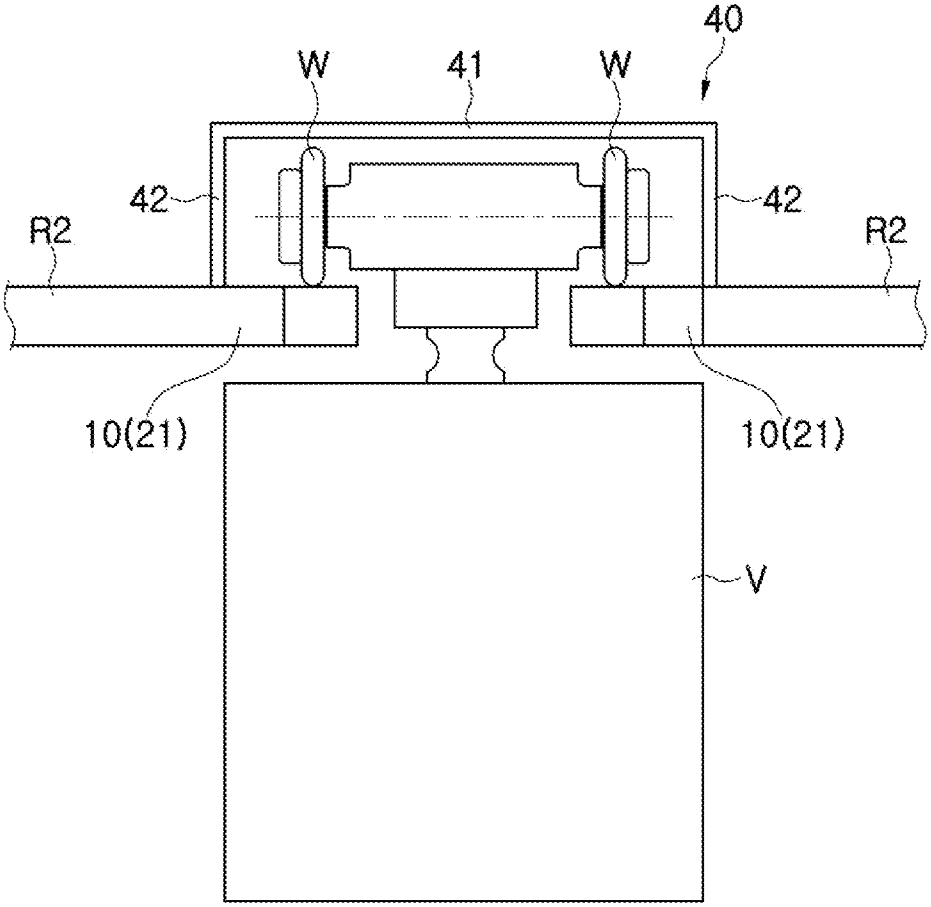

CROSS RAIL STRUCTURE FOR OHT SYSTEM AND OHT SYSTEM USING THE SAME

CROSS REFERENCE TO RELATED APPLICATION

The present application claims priority to Korean Patent Application No. 10-2021-0183772, filed Dec. 21, 2021, the entire contents of which is incorporated by reference herein for all purposes.

BACKGROUND OF THE INVENTION

1. Field of the Invention

The present invention relates to a cross rail structure for an OHT system and an OHT system using the same.

2. Description of the Related Art

In order to manufacture semiconductors, it is necessary to go through eight major processes in a large classification and hundreds of processes in a smaller classification. In order to go through the hundreds of different processes, hundreds of thousands of logistics movements are required between the processes, and a so-called Overhead hoist transport (OHT) is a technique for automating such hundreds of thousands of logistics movements.

The OHT moves a vehicle (also referred to as a front opening unified pod (FOUP)) and transports wafers stored in the FOUP to process-specific manufacturing equipment along rails installed on the ceiling of the factory.

In a case where such OHT equipment has a cross rail in which two rails intersect vertically, the vehicle passes through the cross rail with a cross rail wheel attached to the vehicle. In this process, particles are generated as the cross rail wheel wears out due to a step between the rails. Although the speed of the vehicle is reduced to minimize particle generation, it is not possible to completely stop particle generation.

Meanwhile, a cross wheel is required to be installed on a vehicle that passes through a cross rail, but, in a case where a cross rail is adopted in the process of expanding an equipment line, there may be a problem that excessive costs are incurred because the cross wheel is installed on all existing vehicles (which vehicle will pass through the cross rail is not known, so the cross rail is required to be installed on all vehicles).

SUMMARY OF THE INVENTION

The present invention has been made to solve such problems in the related art, and an object of the present invention is to provide a cross rail structure for an OHT system capable of solving problems caused from a cross rail, and an OHT system using the same.

To solve the above problems, according to the present invention, there is provided a cross rail structure for an OHT system, that is a point at which two orthogonal rails among rails that are installed in an OHT system and transport vehicles intersect with each other.

The cross rail structure includes a pair of auxiliary rails that are installed at substantially the same height as the rail at the point at which the rails intersect with each other, and disposed parallel to each other at a predetermined distance, a movement unit that moves the auxiliary rails up and down, a rotation unit that rotates the auxiliary rail so that the auxiliary rails are disposed in any one of two directions orthogonal to each other, and a distance holding unit that holds a distance between the pair of auxiliary rails without an interference with the vehicle.

Preferably, the cross rail structure further includes a vehicle detection sensor that is installed at a certain distance from a cross rail among the rails and detects a vehicle entering the cross rail.

The movement unit may include a moving part frame that has a plate shape and is disposed above the auxiliary rail and fixed to the rail by a frame arm, a piston that is installed at the moving part frame and is a hydraulic device, and a piston arm that has one end coupled with the piston and the other end coupled to the auxiliary rail.

The rotation unit may include a rotating part frame that has a plate shape and is disposed above the auxiliary rail and fixed to the rail by a frame arm, a motor that is installed at the rotating part frame, and a rotating arm that has one end coupled to the motor and the other end coupled to the auxiliary rail in order to transmit rotation of the motor to the auxiliary rail.

A pair of the pistons may be provided.

The cross rail structure may further include a rotating part frame that has a plate shape and has both ends respectively coupled to the pair of the pistons.

Preferably, the rotation unit is fixed to the moving part frame, and rotates the pair of the pistons coupled to the rotating part frame and the auxiliary rail together by rotating the rotating part frame.

The moving part frame may be provided with a guide hole that is an arc-shape through-hole, and the guide hole may be disposed so that the piston arm penetrates the guide hole.

The distance holding unit may include a first member that has a plate shape and is disposed above the auxiliary rail, and a pair of second members that extend downward from both ends of the first member and are coupled to the auxiliary rails.

Preferably, the vehicle detection sensor is an infrared sensor, and four vehicle detection sensors are installed around the intersection.

According to the present invention, there is also provided an OHT system including the cross rail structure for the OHT system described above.

According to the present invention, it is possible to provide a cross rail structure for an OHT system capable of solving problems caused from a cross rail, and an OHT system using the same.

BRIEF DESCRIPTION OF THE DRAWINGS

The above and other objectives, features, and other advantages of the present disclosure will be more clearly understood from the following detailed description taken in conjunction with the accompanying drawings, in which:

FIG. 1 to FIG. 4 are diagrams illustrating an operation of a cross rail structure for an OHT system according to an embodiment of the present invention; and FIG. 5 is a diagram illustrating a relationship between an auxiliary rail and a vehicle.

DESCRIPTION OF THE PREFERRED EMBODIMENTS

Hereinafter, preferred embodiments of the present invention will be described in detail with reference to the drawings in order to provide specific contents for embodying the present invention.

FIG. 1 to FIG. 4 are diagrams illustrating an operation of a cross rail structure for an OHT system according to an embodiment of the present invention. FIG. 5 is a diagram illustrating a relationship between an auxiliary rail and a vehicle.

First, a cross rail structure for an OHT system according to a first aspect of the present invention will be described. The cross rail structure refers to a point at which two orthogonal rails intersect with each other among rails that are installed in an OHT system and transport vehicles, as illustrated in FIGS. 1 to 4. In FIGS. 1 to 4, two orthogonal rails are indicated by R1 and R2, respectively. R1 indicates the rail in an x-axis direction, and R2 indicates the rail in a y-axis direction, but this is indicated freely, and it is not necessary that R1 indicates the rail in the x-axis direction and R2 indicates the rail in the y-axis direction.

The cross rail structure according to the present embodiment includes an auxiliary rail 10, a movement unit 20, a rotation unit 30, a distance holding unit 40, and a vehicle detection sensor 50.

A pair of the auxiliary rails 10 are configured to be installed at substantially the same height as the rail at the point at which rails R intersect with each other, and be disposed parallel to each other at a predetermined distance. Substantially the same height means that, although the height is not exactly same (error is not 0), there is almost no difference in height so that, when a vehicle V moves from the rail to the auxiliary rail 10, a wheel W can move smoothly without causing a large vibration.

The movement unit 20 is configured to move the auxiliary rail 10 up and down and includes a moving part frame 21, a frame arm 22, a piston 23, a piston arm 24, and a guide hole 25.

The moving part frame 21 is configured to have a plate shape and be disposed above the auxiliary rail 10 and is fixed to the rail R by the frame arm 22. In the present embodiment, the moving part frame 21 has a rectangular shape, and a total of four frame arms 22 are installed at four corners of the moving part frame 21, respectively. The shape of the moving part frame 21 or the number of frame arms 22 are not limited, and the design can be changed appropriately according to the situation at the site.

A pair of the pistons 23 are provided as illustrated in FIGS. 1 to 4.

The piston arm 24 is configured to connect the piston 23 and the auxiliary rail 10 to each other, and a pair is installed similar to the pistons 23. In the present embodiment, the piston arm 24 is not directly coupled to the auxiliary rail 10, but to the distance holding unit 40. The piston 23 and the auxiliary rail 10 are coupled to each other through the distance holding unit 40.

The pistons 23 do not necessarily have to be a pair. In a case where the stiffness of the distance holding unit 40 is large enough so that, when one side of the distance holding unit 40 is lifted with one piston 23, there is little sagging of the distance holding unit 40, and thus there is no problem with the rotation of the auxiliary rail 10, and one piston 23 can withstand the weight of the pair of auxiliary rails 10 and the weight of the distance holding unit 40, the one piston 23 can also be used. However, since using a pair of pistons 23 can cause the auxiliary rails 10 to much more stably operate than a case using one piston 23, it is preferable to use a pair of pistons 23, and thus, a pair of pistons 23 is used in the present embodiment.

The moving part frame 21 is provided with a guide hole 25 that is an arc-shaped through-hole, the piston arm 24 is disposed to pass through the guide hole 25.

The rotation unit 30 is configured to rotate the auxiliary rail 10 around the center of the intersection. In the present embodiment, the rotation unit 30 includes a rotating part frame 31 and a motor 32.

The motor 32 is fixed to the moving part frame 21 and is illustrated in a box shape. The motor 32 refers to a device that rotates a certain component and can be configured to include an electric motor and a speed reducer. Meanwhile, it is not necessary to use an electric motor as the motor, and the motor may include a component such as a piston, that performs a linear motion and a component such as a rack and a pinion, that converts a linear motion into a rotational motion.

The rotating part frame 31 is configured to be coupled to the upper part of the motor 32 and rotated by the motor 32. Since the pair of pistons 23 is installed on the upper part of the rotating part frame 31, the piston 23 along with the rotating part frame 31 and the auxiliary rail 10 coupled to the piston 23 is rotated by the motor 32. The piston arm 24 is installed to penetrate the through-hole provided in the rotating part frame 31.

In the present embodiment, the movement unit 20 and the rotation unit 30 share a partial configuration, and the rotation unit 30 is configured to rotate the auxiliary rail 10 along with a partial configuration of the movement unit 20. The rotation unit 30 may have completely separate configuration from the movement unit 20. At this time, the action of the rotation unit 30 is required while the auxiliary rail 10 is moving upward by the movement unit 20, and thus the configuration is required to be made accordingly.

The distance holding unit 40 is configured to be coupled to the auxiliary rail 10 so that the distance between the pair of auxiliary rails 10 can be held. As illustrated in FIG. 5, the distance holding unit 40 has a first member 41 and a second member 42 and has a C-shape as a whole.

The vehicle detection sensor 50 is configured to be installed at a predetermined distance from the cross rail (intersection) of the rails R and detect a vehicle V entering the cross rail. An infrared sensor is used as the vehicle detection sensor 50, and four vehicle detection sensors 50 are installed to enable detection of all vehicles V entering the cross rail from all directions as illustrated in FIG. 1.

The function, the action, and the effects of the described configuration will be described below by describing the mechanism for rotating the auxiliary rail 10 using the configuration described above.

FIG. 1 illustrates a state where the auxiliary rail 10 are disposed in a state where the vehicle V is movable in the x-axis direction.

In this state, when the vehicle detection sensor 50 detects the vehicle that moves in the y-axis direction, the auxiliary rail 10 is rotated, and this proceeds in the following manner.

First, the piston arm 24 is moved upward (+z axis direction in FIG. 1) by using the piston 23. Since the piston arm 24 is coupled to the auxiliary rail 10 through the distance holding unit 40, the auxiliary rail 10 moves upward as illustrated in FIG. 2.

When the rotating part frame 31 is rotated by using the motor 32 in the state illustrated in FIG. 2, the piston 23 coupled to the rotating part frame 31 rotates, and the piston arm 24 rotates along the guide hole 25 and rotates the auxiliary rail 10 coupled to the piston arm 24. FIG. 3 illustrates such a rotation state of the auxiliary rail 10.

When the piston arm 24 is lowered downward (−z axis direction in FIG. 1) in a state where the auxiliary rail 10 is rotated, the auxiliary rail 10 moves downward, and the vehicle V can move in the y-axis direction, as illustrated in FIG. 4.

A second aspect of the present invention relates to an OHT system, which is characterized by including the above-described cross rail structure and a control unit for the OHT system.

The cross rail structure for the OHT system has been described, and a control mechanism for operating the cross rail structure for the OHT system by the control unit has been described. Thus, the additional description will be omitted.

Hitherto, specific details for implementing the present invention are provided by describing the preferred embodiment of the present invention, but the technical ideas of the present invention are not limited to the described embodiment, and can be embodied in various forms within the scope of the technical ideas of the present invention.

Those skilled in the art should understand that the present invention may be embodied in other specific forms without changing the technical spirit or essential characteristics thereof, so the embodiments described above are illustrative in all aspects and are not restrictive.

It will be apparent that the present embodiment and the drawings attached to this specification just clearly represent a part of the technical spirit included in the present invention, and all modification examples and specific embodiments that can be easily inferred by those skilled in the art within the scope of the technical spirit contained in the specification and drawings of the present invention are included in the scope of the present invention.

Therefore, the spirit of the present invention should not be limited to the described embodiments, and not only the claims to be described later, but also all those that have equal or equivalent modifications to the claims will be said to belong to the scope of the spirit of the present invention.

What is claimed is:

1. A cross rail structure for an OHT system, that is an intersection point at which two orthogonal rails among rails that are installed in the OHT system and transport vehicles intersect with each other, the cross rail structure comprising:
- a pair of auxiliary rails that are installed at substantially the same height as a rail at the intersection point at which the two orthogonal rails intersect with each other, and disposed parallel to each other at a predetermined distance;
- a movement unit that moves the pair of auxiliary rails up and down;
- a rotation unit that rotates the pair of auxiliary rails so that the pair of auxiliary rails are disposed in any one of two directions orthogonal to each other; and
- a distance holding unit that holds a distance between the pair of auxiliary rails without an interference with the transport vehicles, wherein the movement unit includes:
- a moving part frame that has a plate shape and is disposed above the pair of auxiliary rails and fixed to the rail by a frame arm,
- a piston that is installed at the moving part frame and is a hydraulic device, and
- a piston arm that has one end coupled with the piston and the other end coupled to the pair of auxiliary rails.

2. The cross rail structure for the OHT system according to claim 1, further comprising:
- a vehicle detection sensor that is installed at a certain distance from a cross rail among the rails and detects a vehicle entering the cross rail.

3. The cross rail structure for the OHT system according to claim 1, wherein the rotation unit includes:
- a rotating part frame that has a plate shape and is disposed above the pair of auxiliary rails and fixed to the rail by the frame arm,
- a motor that is installed at the rotating part frame, and
- a rotating arm that has one end coupled to the motor and the other end coupled to the pair of auxiliary rails in order to transmit rotation of the motor to the pair of auxiliary rails.

4. The cross rail structure for the OHT system according to claim 1, wherein the piston is provided as a pair of pistons,
- the cross rail structure further comprises a rotating part frame that has a plate shape and has both ends respectively coupled to the pair of pistons, and
- the rotation unit is a motor that is fixed to the moving part frame, and rotates the pair of pistons coupled to the rotating part frame and the pair of auxiliary rails together by rotating the rotating part frame.

5. The cross rail structure for the OHT system according to claim 4, wherein the moving part frame is provided with a guide hole that is an arc-shape through-hole, and the guide hole is disposed so that the piston arm penetrates the guide hole.

6. The cross rail structure for the OHT system according to claim 1, wherein the distance holding unit includes:
- a first member that has a plate shape and is disposed above the pair of auxiliary rails, and
- a pair of second members that extend downward from both ends of the first member and are coupled to the pair of auxiliary rails.

7. The cross rail structure for the OHT system according to claim 1, wherein the distance holding unit includes:
- a first member that has a plate shape and is disposed above the pair of auxiliary rails, and
- a pair of second members that extend downward from both ends of the first member and are coupled to the pair of auxiliary rails.

8. The cross rail structure for the OHT system according to claim 4, wherein the distance holding unit includes:
- a first member that has a plate shape and is disposed above the pair of auxiliary rail, and
- a pair of second members that extend downward from both ends of the first member and are coupled to the pair of auxiliary rails.

9. The cross rail structure for the OHT system according to claim 2, wherein the vehicle detection sensor is an infrared sensor, and four vehicle detection sensors are installed around the intersection point.

10. An OHT system comprising:
- a cross rail structure for an OHT system, that is an intersection point at which two orthogonal rails among rails that are installed in the OHT system and transport vehicles intersect with each other, wherein the cross rail structure includes:
- a pair of auxiliary rails that are installed at substantially the same height as a rail at the intersection point at which the two orthogonal rails intersect with each other, and disposed parallel to each other at a predetermined distance;

a movement unit that moves the pair of auxiliary rails up and down;

a rotation unit that rotates the pair of auxiliary rails so that the pair of auxiliary rails are disposed in any one of two directions orthogonal to each other; and a distance holding unit that holds a distance between the pair of auxiliary rails without an interference with the transport vehicles, wherein the movement unit includes:

a moving part frame that has a plate shape and is disposed above the pair of auxiliary rails and fixed to the rail by a frame arm, a piston that is installed at the moving part frame and is a hydraulic device, and a piston arm that has one end coupled with the piston and the other end coupled to the pair of auxiliary rails; and a control unit that controls the movement unit and the rotation unit of the cross rail structure for an OHT system.

11. The OHT system according to claim 10, further comprising:

a vehicle detection sensor that is installed at a certain distance from a cross rail among the rails and detects a vehicle entering the cross rail.

12. The OHT system according to claim 10, wherein the rotation unit includes a rotating part frame that has a plate shape and is disposed above the pair of auxiliary rails and fixed to the rail by the frame arm, a motor that is installed at the rotating part frame, and a rotating arm that has one end coupled to the motor and the other end coupled to the pair of auxiliary rails in order to transmit rotation of the motor to the pair of auxiliary rails.

13. The OHT system according to claim 10, wherein the piston is provided as a pair of pistons, the cross rail structure further comprises a rotating part frame that has a plate shape and has both ends respectively coupled to the pair of pistons, and the rotation unit is fixed to the moving part frame, and rotates the pair of pistons coupled to the rotating part frame and the pair of auxiliary rails together by rotating the rotating part frame.

14. The OHT system according to claim 13, wherein the moving part frame is provided with a guide hole that is an arc-shape through-hole, and the guide hole is disposed so that the piston arm penetrates the guide hole.

15. The OHT system according to claim 10, wherein the distance holding unit includes a first member that has a plate shape and is disposed above the pair of auxiliary rails, and a pair of second members that extend downward from both ends of the first member and are coupled to the pair of auxiliary rails.

16. The OHT system according to claim 10, wherein the distance holding unit includes a first member that has a plate shape and is disposed above the pair of auxiliary rails, and a pair of second members that extend downward from both ends of the first member and are coupled to the pair of auxiliary rails.

17. The OHT system according to claim 11, wherein the vehicle detection sensor is an infrared sensor, and four vehicle detection sensors are installed around the intersection point.

18. A cross rail structure for an OHT system, that is an intersection point at which two orthogonal rails among rails that are installed in the OHT system and transport vehicles intersect with each other, the cross rail structure comprising:

a pair of auxiliary rails that are installed at substantially the same height as a rail at the intersection point at which the rails intersect with each other, and disposed parallel to each other at a predetermined distance;

a movement unit that moves the pair of auxiliary rails up and down;

a rotation unit that rotates the pair of auxiliary rails so that the auxiliary rails are disposed in any one of two directions orthogonal to each other; and a distance holding unit that includes a first member that has a plate shape and is disposed above the pair of auxiliary rails and a pair of second members that extend downward from both ends of the first member and are coupled to the pair of auxiliary rails, and holds a distance between the pair of auxiliary rails without an interference with movements of the transport vehicles; and a vehicle detection sensor that is installed at a certain distance from a cross rail among the rails, detects a vehicle entering the cross rail, and is an infrared sensor, four vehicle detection sensors being installed around the intersection point, wherein the movement unit includes:

a moving part frame that has a plate shape and is disposed above the pair of auxiliary rail and fixed to the rail by a frame arm, a pair of pistons that are installed at the moving part frame and are hydraulic devices, a piston arm that has one end coupled with the pair of pistons and the other end coupled to the pair of auxiliary rails, and a rotating part frame that has a plate shape and has both ends respectively coupled to the pair of pistons, wherein the moving part frame is provided with a guide hole that is an arc-shape through-hole, wherein the guide hole is disposed so that the piston arm penetrates the guide hole, and wherein the rotation unit is a motor that is fixed to the moving part frame, and rotates the pair of pistons coupled to the rotating part frame and the pair of auxiliary rails together by rotating the rotating part frame.

* * * * *